(12) United States Patent
Kraemer et al.

(10) Patent No.: US 10,911,491 B2
(45) Date of Patent: Feb. 2, 2021

(54) ENCRYPTION WITH SEALED KEYS

(71) Applicant: International Business Machines Corporation, Armonk, NY (US)

(72) Inventors: Marco Kraemer, Sindelfingen (DE); Hoang-Nam Nguyen, San Jose, CA (US); Carsten Otte, Stuttgart (DE); Christoph Raisch, Gerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 15/817,341

(22) Filed: Nov. 20, 2017

(65) Prior Publication Data
US 2019/0158536 A1 May 23, 2019

(51) Int. Cl.
*G06F 21/00* (2013.01)
*H04L 29/06* (2006.01)
*G06F 21/53* (2013.01)

(52) U.S. Cl.
CPC ............ *H04L 63/168* (2013.01); *G06F 21/53* (2013.01); *H04L 63/0272* (2013.01); *H04L 63/0281* (2013.01); *H04L 63/061* (2013.01); *H04L 63/1408* (2013.01); *H04L 63/166* (2013.01); *H04L 63/205* (2013.01)

(58) Field of Classification Search
CPC ............... H04L 63/168; H04L 63/0272; H04L 63/0281; H04L 63/166; H04L 63/205; H04L 63/1408; H04L 63/061; G06F 21/53
See application file for complete search history.

(56) References Cited

U.S. PATENT DOCUMENTS

| 8,996,873 B1* | 3/2015 | Pahl ...................... H04L 63/061 |
| | | 713/173 |
| 9,942,208 B2 | 4/2018 | Lockhart et al. |
| 10,423,791 B2 | 9/2019 | Wells et al. |
| 2001/0032254 A1* | 10/2001 | Hawkins ................. H04W 4/18 |
| | | 709/219 |
| 2006/0165078 A1* | 7/2006 | Gopinath .............. H04W 48/04 |
| | | 370/389 |
| 2008/0181399 A1 | 7/2008 | Weise et al. |
| 2010/0122271 A1* | 5/2010 | Labour ............... G06F 9/44526 |
| | | 719/328 |
| 2012/0102541 A1* | 4/2012 | Groskop ............... G06F 21/577 |
| | | 726/1 |
| 2013/0055287 A1* | 2/2013 | Pope ....................... G06F 9/546 |
| | | 719/314 |
| 2013/0227303 A1 | 8/2013 | Kadatch et al. |

(Continued)

*Primary Examiner* — Kendall Dolly
*Assistant Examiner* — Kevin Ayala
(74) *Attorney, Agent, or Firm* — Cantor Colburn LLP; Noah Sharkan

(57) ABSTRACT

An aspect includes a computer system with a network encryption device and a trusted container within firmware or hardware and/or within a virtual machine running on the computer system. The network encryption device includes a key store for storing secret encryption keys and a network traffic encryption engine for negotiating and/or storing encryption keys in the key store and/or for encrypting and/or decrypting network traffic using the encryption keys from the key store. The trusted container includes a flow analyzer for analyzing network traffic received from the network encryption device.

13 Claims, 5 Drawing Sheets

(56) References Cited

U.S. PATENT DOCUMENTS

| | | | |
|---|---|---|---|
| 2014/0282453 A1* | 9/2014 | O'Rourke | G06F 40/154 |
| | | | 717/154 |
| 2014/0289535 A1 | 9/2014 | Gan | |
| 2014/0317081 A1* | 10/2014 | Dubois-Ferriere | |
| | | | G06F 16/9535 |
| | | | 707/706 |
| 2015/0288514 A1* | 10/2015 | Pahl | H04L 9/085 |
| | | | 713/171 |
| 2016/0241574 A1* | 8/2016 | Kumar | H04L 63/12 |
| 2016/0352870 A1 | 12/2016 | Manapragada et al. | |
| 2017/0093921 A1* | 3/2017 | Duan | G06F 9/45558 |
| 2017/0195167 A1* | 7/2017 | Shibata | H04L 41/0677 |
| 2017/0279773 A1* | 9/2017 | Koripella | H04L 43/0876 |
| 2018/0006816 A1* | 1/2018 | Taub | H04L 9/0841 |
| 2018/0060567 A1* | 3/2018 | Ilaiwi | G06F 21/53 |
| 2018/0337889 A1* | 11/2018 | Panchapakesan | H04L 63/0272 |

\* cited by examiner

ENCRYPTION WITH SEALED KEYS

BACKGROUND

The present invention relates in general to data processing systems, and in particular, to a computer system with a network encryption device and a trusted container within a firmware or hardware and/or within a virtual machine running on the computer system.

In US 2016/0352870 A1 an approach is proposed that contemplates systems and methods to support a mechanism to offload all aspects of inline transport layer security and/or secure socket layer (TLS/SSL) processing of an application running on a server/host to an embedded networking device such as a Network Interface Card (NIC), which serves as a hardware accelerator for all applications running on the server that need to have a secure connection with a remote client device over a network. By utilizing a plurality of its software and hardware features, the embedded networking device is configured to process all TLS/SSL operations of the secure connection inline, i.e., the TLS/SSL operations are performed as packets are transferred between the host and the client over the network, rather than having the SSL operations offloaded to the device, which then returns the packets to the host (or the remote client device) before they can be transmitted to the remote client device over the network (or to the application on the host). The embedded networking device, in effect, acts as a proxy on behalf of applications running on the server and perform the TLS/SSL operations (e.g., handshake and record processing) for the connection established with the remote client device on behalf of the hosted applications.

SUMMARY

A computer system with a network encryption device and a trusted container within firmware or hardware and/or within a virtual machine running on the computer system is disclosed, the network encryption device includes a key store for storing secret encryption keys and a network traffic encryption engine for negotiating and/or storing encryption keys in the key store and/or for encrypting and/or decrypting network traffic using the encryption keys from the key store. Further the trusted container includes a flow analyzer for analyzing network traffic received from the network encryption device.

Further a method includes providing encryption with sealed keys in a computer system having a network encryption device and a trusted container within firmware or hardware and/or a virtual machine running on the computer system. The network encryption device provides a secure interface for forwarding data unaltered through a host/operating system between an application and a network interface device. The method includes providing a network traffic encryption engine for negotiating and/or storing encryption keys in a key store implemented in the network encryption device. The method also includes encrypting and/or decrypting network traffic using the encryption keys from the key store. The method further includes analyzing network traffic received from the network encryption device by a flow analyzer implemented in the trusted container.

Further disclosed is a computer program product for providing encryption with sealed keys in a computer system having a network encryption device and a trusted container within firmware or hardware and/or a virtual machine running on the computer system. The network encryption device provides a secure interface for forwarding data unaltered through a host/operating system between an application and a network interface device, the computer program product including a computer readable storage medium having program instructions embodied therewith, the program instructions executable by a computer to cause the computer to perform a method including: providing a network traffic encryption engine for negotiating and/or storing encryption keys in a key store implemented in the network encryption device; (encrypting and/or decrypting network traffic using the encryption keys from the key store; and analyzing network traffic received from the network encryption device by a flow analyzer implemented in the trusted container.

BRIEF DESCRIPTION OF THE DRAWINGS

The present invention together with the above-mentioned and other objects and advantages may best be understood from the following detailed description of the embodiments, but not restricted to the embodiments.

DETAILED DESCRIPTION

Figure 1:
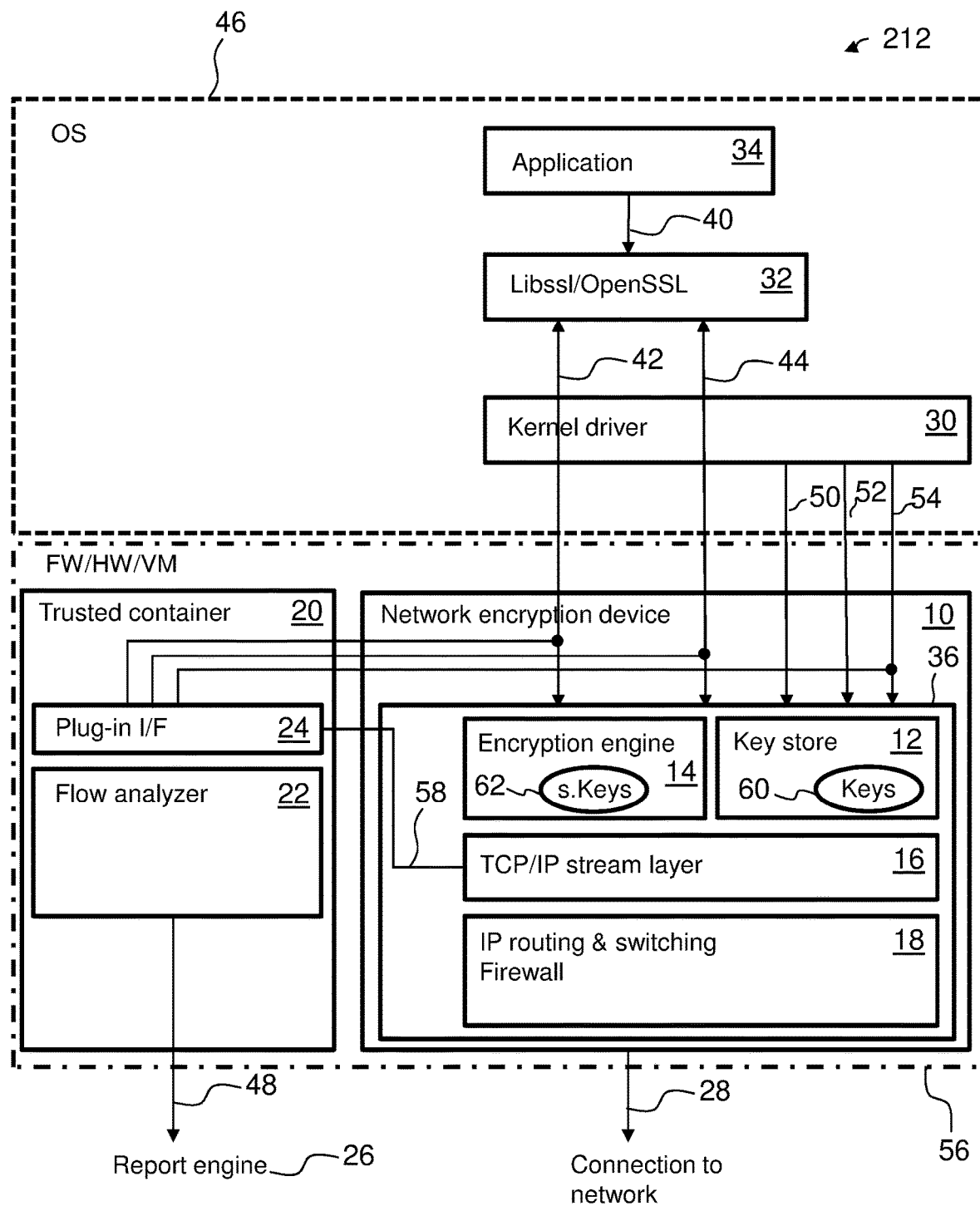
FIG. 1 depicts a block diagram of a part of a computer system according to an embodiment of the invention with a network encryption device and a trusted container within a firmware or hardware and/or within a virtual machine running on the computer system.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments provide a computer system with a network encryption device and a trusted container within a firmware or hardware and/or within a virtual machine running on the computer system.

The illustrative embodiments are sometimes described herein using particular technologies only as an example for the clarity of the description. The illustrative embodiments may be used for a computer system with a network encryption device and a trusted container within a firmware or hardware and/or within a virtual machine running on the computer system, the network encryption device comprising (i) a key store for storing secret encryption keys; (ii) a network traffic encryption engine for negotiating and/or storing encryption keys in the key store and/or for encrypting and/or decrypting network traffic using the encryption keys from the key store. Further the trusted container comprises a flow analyzer for analyzing network traffic received from the network encryption device.

The encryption keys in the key store may be used to negotiate a second set of dynamic keys, so-called session keys, with the remote communication side used for encrypting the network traffic. The session keys can be stored in the network traffic encryption engine, instead of in the key store.

Secure networks use encryption keys to protect network traffic of data exchange. Current implementations for encrypted network traffic have multiple attack points to steal the security credentials. Embodiments include a work split for operating system libraries, key stores plus encryption units and authorized network analyzer access points.

With the computer system and the method according to embodiments of the invention an unchanged application is enabled to use encryption keys for network traffic. Thus, an authorized application may be enabled to analyze the data while removing any potential way to steal a key from these two locations. This is achieved using the inventive system and method without having a direct access paradigm. The key store is no longer accessible to the user or a user operation system.

A system can include encryption functionality in firmware or hardware outside an operating system and with plug-in interfaces for pre-encryption data analysis by sending to a flow analyzer running outside the software or operating system. The host/operating system may work as an active pass-through for the requests/data executed between an application and the remote communication side, instead of operating on the requests/data itself.

The system enables socket operations and data as well as key operations. The system further includes a container, also known as sandbox. A sandbox is a container, in particular a virtual container, in which untrusted programs can be safely run. The sandbox enables running a flow analyzer code connected through the plug-in interfaces. The plug-in interface may also transport application characterization identifiers. A modified transport layer security/secure socket layer (TSL/SSL) library may be foreseen for implementing the system. Forwarding of flow analyzer results to a centralized analysis infrastructure may be performed, where also data delivered via plug-in interfaces may be included.

FIG. 1 depicts a block diagram of a part of a computer system 212 according to an embodiment of the invention with a network encryption device 10 and a trusted container 20 within a firmware or hardware 56 and/or within a virtual machine running on the computer system 212. The network encryption device 10 comprises a key store 12 for storing secret encryption keys 60, a network traffic encryption engine 14 as an encryption layer to negotiate and/or store encryption keys 60 in the key store 12 and/or encrypt and/or decrypt network traffic using the encryption keys 60 from the key store 12.

The encryption keys 60 in the key store 12 may be used to negotiate a second set of dynamic keys, so-called session keys 62 (abbreviated s. keys in the Figure), with the remote communication side used for encrypting the network traffic. The session keys 62 could be stored in the network traffic encryption engine 14, instead of in the key store 12.

The trusted container 20, also commonly known as a sandbox, comprises a flow analyzer 22 for analyzing network traffic received from the network encryption device 10. A sandbox is a container, in particular a virtual container, in which untrusted programs can be safely run. These untrusted programs may typically be implemented through virtual machines or partitions.

The trusted container 20 is connected to the network encryption device 10 via a plug-in interface 24, particularly a data flow analyzer interface 24, which may commonly be a sniffer interface. The plug-in interface 24 may transport application specific identifiers 54.

The operating system 46 comprises a secure socket layer (SSL) library 32 for forwarding stream socket calls 42 and/or key operation calls 44 to the network encryption device 10. The stream socket calls 42 and/or key operation calls 44 are non-encrypted calls.

The stream socket calls 42 and/or key operation calls 44 are forwarded through a kernel driver 30 to the network encryption device 10.

The plug-in interface 24 in the trusted container 20 may receive the stream socket calls 42 and/or the key operation calls 44 as input and forwarding them to the flow analyzer 22 for analyzing network traffic. The flow analyzer 22 may generate and/or forward a flow report to a report engine system 26. The flow report 48 may include a plurality of application specific identifiers 54.

The computer system 212 according to an embodiment of the invention may serve as a platform for the method for providing encryption with sealed keys 60. Thus, the network encryption device 10 provides a secure interface for forwarding data unaltered through a host of the operating system 46 between an application 34 and a network interface device 28. The host/operating system 46 may work as an active pass-through for the requests/data executed between the application 34 and the remote communication side, instead of operating on the requests/data itself.

The method can include providing a network traffic encryption engine 14 for negotiating and/or storing encryption keys 60 in the key store 12 implemented in the network encryption device 10. Further the method can include encrypting and/or decrypting network traffic using the encryption keys 60 from the key store 12 and analyzing network traffic received from the network encryption device 10 by the flow analyzer 22 implemented in the trusted container 20. The secure socket layer library 32 is provided to direct data from the application 34 to the network encryption device 10, where data are comprise stream socket calls 42 and/or key operation calls 44 and/or application specific identifiers 54. The stream socket calls 42 and/or key operation calls 44 are non-encrypted calls. Data are forwarded through the kernel driver 30. The flow analyzer 22 generates and/or forwards a flow report 48 to a report engine system 26, where the flow report 48 comprises also application specific identifiers 54. The network traffic is forwarded from the network encryption device 10 to the flow analyzer 22 via the plug-in interface 24, which may be implemented as a sniffer interface.

As described in FIG. 1, the application 34 uses an unchanged interface to execute user library programming calls to access the SSL library 32, which is modified to forward not encrypted stream socket calls 42 and key operation calls 44 with a key selector through the kernel driver 30 to the network encryption device 10. The kernel driver 30 communicates to a TCP/IP layer 36 as part of the network encryption device 10. The kernel driver 30 forwards the network configuration 50 and non-data stream network frames 52. The kernel driver 30 also forwards an application specific identity 54, comprising application name, fingerprint and application user ID) for data streams to the TCP/IP layer 36.

According to the embodiment encryption and key store and negotiation is moved to a place which is out of reach of the Operating System 46 and the application 34, namely in the network encryption device 10. Further the plug-in interface 24 implemented as a sniffer interface forwards stream data 58 from the TCP/IP stream layer 16 as well as metadata like the stream socket calls 42 and the key operation calls 44 to a flow analyzer 22, which may be implemented as a third party flow analyzer code, to analyze network traffic in plain-text. The flow analyzer 22 forwards flow reports 48, comprising the extended application specific identity 54 to a report engine system 26 like, e.g., X Force, which enables matching of the flow report 48 to encrypted network data. Such a tool may serve for gathering useful security information, enabling to close ports on a fault occurring. The application specific identity 54 may include usual Network Layer 2-4 6-tuples, like "DMAC SMAC DIP SIP DPORT SPORT" (destination MAC address, source MAC address, destination IP address, source IP address, destination port, source port)

Figure 2:
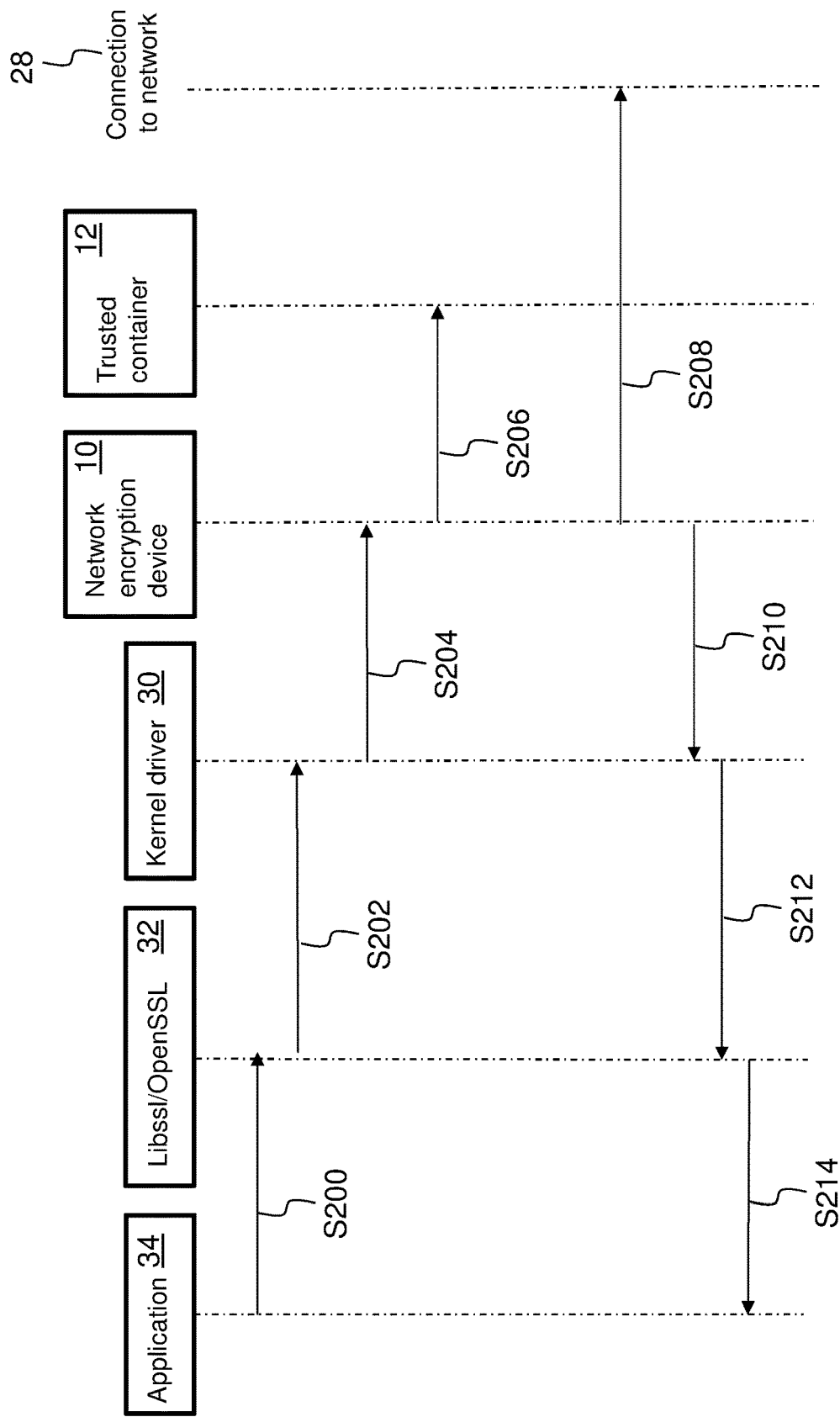
FIG. 2 depicts a message sequence chart for a message with network interaction on a sending side according to an embodiment of the invention.

FIG. 2 depicts a message sequence chart for a message with network interaction on a sending side according to an embodiment of the invention.

Based on a state-of-the-art SSL library, an end-to-end usage of the SSL library may be described as follows. The usage of sockets and system SSL calls to enable a server program to communicate with a client program is described: SO is used as an abbreviation for socket operation, KO for key operation.

To create a stream socket to which client programs can connect, a function call may be used:
  int server_sock;
  server_sock=socket(AF_INET, SOCK_STREAM, 0); //is an SO Now that the server program socket is created, the socket is bound to a port (for example, 1234) that is known to the client program using this function call:
  int rc;
  int namelength;
  struct sockaddr_in name;
  nameLength=sizeof(name);
  memset(&name, '\0', nameLength);
  name. sin_family=AF_INET;
  name.sin_port=1234;
  name.sin_addr.s_addr=INADDR_ANY;
  rc=bind(server_sock, (struct sockaddr*)&name, nameLength); //is an SO To make the server program socket ready to listen for incoming connection request, this function call may be used:
  int rc;
  rc=listen(server_sock, 5); /* allow max of 5 connections */ //is an SO The server program is now ready to begin accepting connections from client programs. To accept connections, these function calls may be used:
  int client_sock;
  int incomingNameLength;
  struct sockaddr_in incomingName;
  client_sock=accept(server_sock, (struct sockaddr *)incomingName, &incomingNameLength); //is an SO After successfully accepting a connection from a client program, the server program must establish the secure socket connection which will result in the SSL handshake being performed. Once the handshake is completed, secure transfer of application data can be done. The secure socket connection may be established with these attribute values:
  The socket descriptor over which the communication is to occur.
  Certificate with label "ServerCertLabel"
  The type of handshake (for example, server) to be performed.
  The set of SSL protocol cipher specifications to be allowed for the secure session specified using 4-character cipher specifications. (For example, ciphers utilizing a Rivest-Shamir-Adleman (RSA) key exchange with either advanced encryption standard (AES) 128/ 256 or triple data encryption algorithm (3DES) encryption.) The cipher is selected by the System SSL server program according to the server's order of usage preference.
  The 4-character cipher specification list in GSK_V3_CIPHER_SPECS_EXPANDED is used.
  The address of a routine to be called by System SSL to read data from the socket for the secure session.
  The address of a routine to be called by System SSL to write data on the socket for the secure session.
  gsk_handle soc_handle;
  int rc;
  gsk_iocallback local_io={secureSocRecv, secureSocSend, NULL, NULL, NULL, NULL};
  rc=gsk_secure_socket_open(env_handle, &soc_handle); //is a KO
  rc=gsk_attribute_set_numeric_value(soc_handle, GSK_FD, client_sock); //is a KO
  rc=gsk_attribute_set_buffer(soc_handle, GSK_KEYRING_LABEL, "ServerCertLabel",0); //is a KO
  rc=gsk_attribute_set_enum(soc_handle, GSK_SESSION_TYPE, GSK_SERVER_SESSION); //is a KO
  rc=gsk_attribute_set_buffer(soc_handle, GSK_V3_CIPHER_SPECS_EXPANDED, "0035002F000A",0); //is a KO
  rc=gsk_attribute_set_enum(soc_handle, GSK_V3_CIPHERS, GSK_V3_CIPHERS_CHAR4); //is a KO
  rc=gsk_attribute_set_callback(soc_handle, GSK_IO_CALLBACK, &local_io); //is a KO
  rc=gsk_secure_socket_init(soc_handle); //is a KO The System SSL program should provide the function to send and receive data over the application socket. The function calls, send( ) and recv( ), are used to send and receive the application data.

```
int secureSocRecv(int fd, void *data, int len, char *user_data) {
return( recv( fd, data, len,0 )); //is an SO
}
int secureSocSend(int fd, void *data, int len, char *user_data) {
return( send( fd, data, len,0 ) ); //is an SO }
```

After the server program successfully calls gsk_secure_socket_init( ), it can now read and write data securely over the application socket. To read application data from the application socket, this code may be used:
  int rc;
  int buffer_length;
  int length_read;
  char *data_buffer;
  rc=gsk_secure_socket_read(soc_handle, data_buffer, buffer_length, &length_read);

To write application data over the application socket, this code may be used:
  int rc;
  int buffer_length;
  int length_written;
  char*data_buffer;
  rc=gsk_secure_socket_write(soc_handle, data_buffer, buffer_length, &length_written);

Once the server program is finished using the application socket to securely send and receive data, it must free all of the System SSL resources for the SSL session and close the socket. To free the System SSL resource for the SSL session, the gsk_secure_socket_close( ) call may be used:
gsk_secure_socket_close(&soc_handle); //is a KO which implies a SO within the network encryption device To free the resources used by the SSL environment, the gsk_environment_close( ) call may be used:
gsk_environment_close(&env_handle); //is a KO Finally, to close the application socket, this function call may be used:
int rc;
rc=close(client_sock); //is an SO
"

Figure 3:
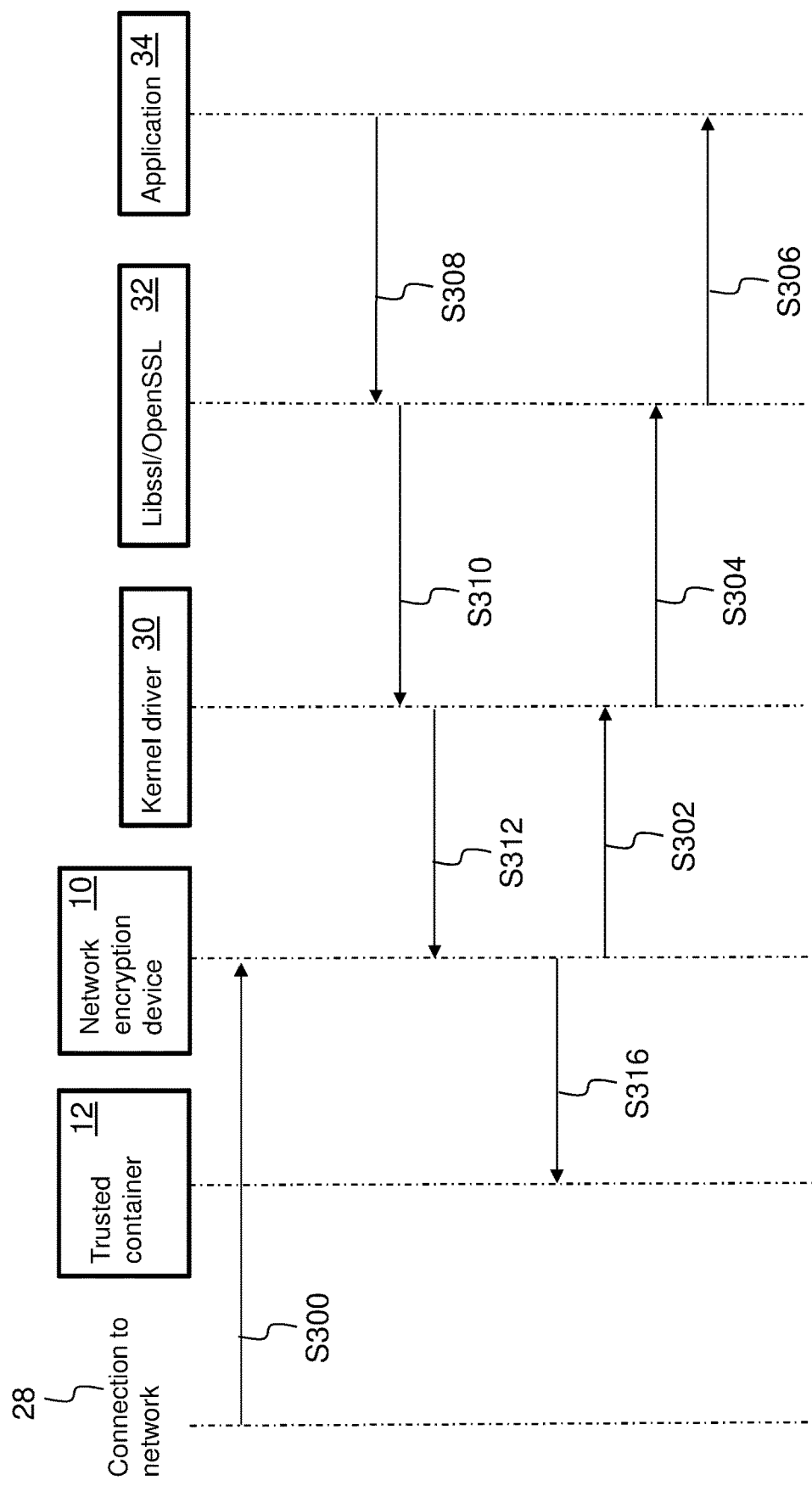
FIG. 3 depicts a message sequence chart for a message with network interaction on a receiving side according to an embodiment of the invention.
Figure 4:
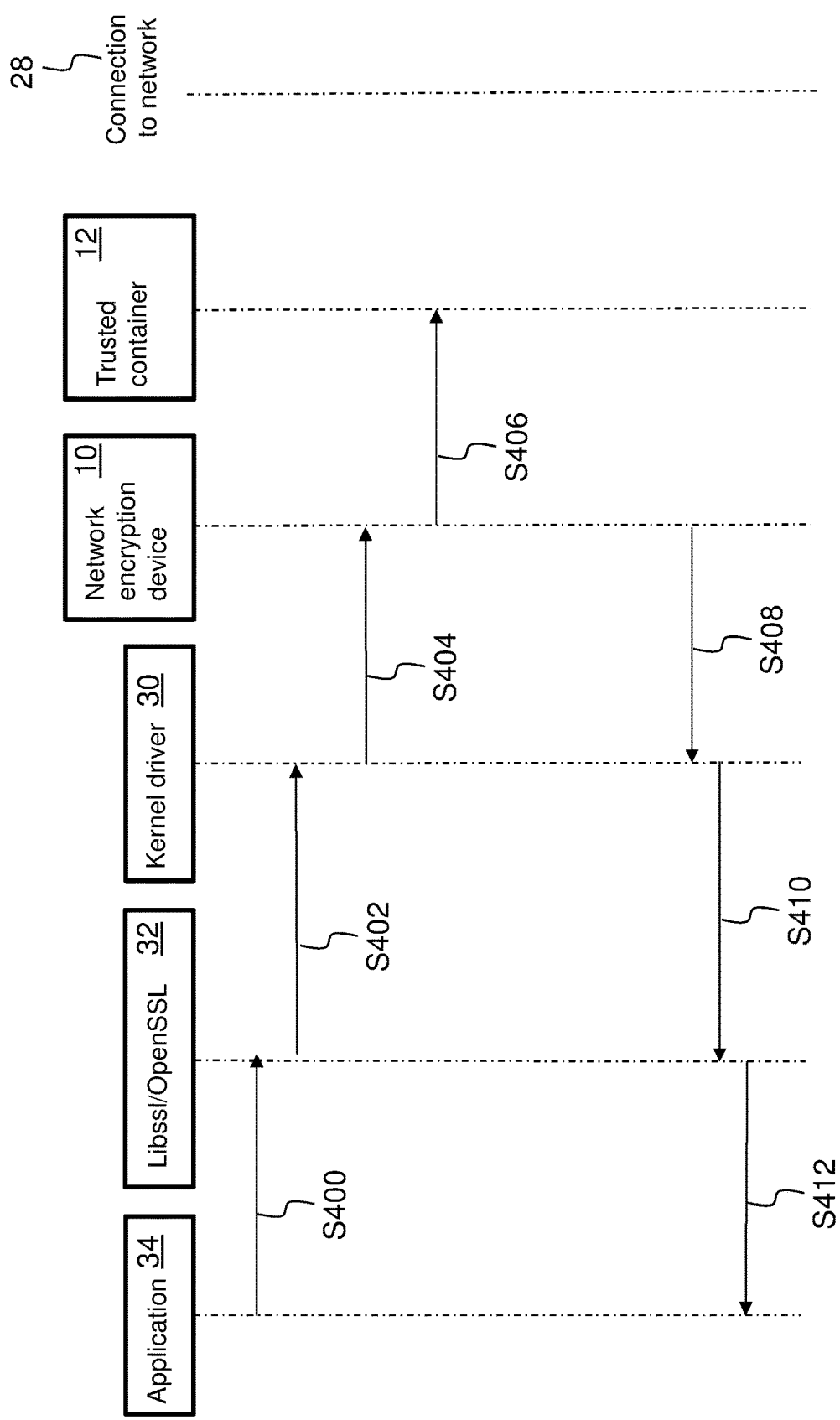
FIG. 4 depicts a message sequence chart for a message without network interaction according to an embodiment of the invention.

As this description is in the domain of messaging protocols, the typical diagram type used in FIGS. 2 to 4 is not a flow chart, but a message sequence chart.

Embodiments of the system and method do not describe end-to-end cryptographic flows, but it replaces all individual end-to-end message exchanges with new ones in FIGS. 2 to 4. Whenever the SSL library 32 on a message initiating side did communicate in prior art with the SSL library 32 on a target side, the inventive embodiment of FIG. 2 is used on initiating side and of FIG. 3 on target side. In cases where the application 34 does not trigger external messaging through the SSL library 32, the inventive embodiment of FIG. 4 is used. Most of the key operation flows are of type "without network interaction", most of the socket operation flows are of type "with network interaction". The inventive embodiment does not modify the existing prior art interaction characteristics.

The network encryption device 10 executes all operations functionally transparent to the application 34 in FIG. 1. This includes encryption/decryption, all required TCP/IP and Ethernet handling, and network address resolution. In the inventive embodiment the network encryption device 10 duplicates all operations and data executed between the network encryption device 10 and the application 34 in clear text to a trusted container 20, e.g., a sandbox, which then can execute deep packet inspection on the data passing through the network encryption device 10. This was not possible in prior art without modifying the end-to-end encrypted data stream. The position of the flow analyzer 22 is changed from "bump in the wire" to conceptually a port mirroring configuration before the encryption happens. The difference to prior art port mirroring is, that in the inventive embodiment the flow analyzer 22 receives the data on a pre-encryption application programming interface (API) layer versus an encrypted data packet layer in prior art.

The plug-in interface 24, implemented e.g. as a sniffer interface, comprises a message queue which is filled from the network encryption device 10 with individual messages as shown in FIGS. 2 to 4. Each message contains either the complete sending side request (FIG. 2), the complete receiving side request with response (FIG. 3) or the complete local only request with response (FIG. 4). If the flow analyzer 22 does not pick messages of the message queue fast enough, and the network encryption device 10 detects it would overflow the queue, the network encryption device 10 will delay returning completions to the application 34, which then will implicitly slow down the sending rate (a well-known back pressure mechanism on HW/SW interaction). For optimizing parallelism multiple message queues can be implemented in such a way, that each message queue is used for an individual flow (identified by the application specific ID), therefore multiple applications 34 can receive back pressure independently without interfering with each other.

The message sequence in FIG. 2 for an example of a message with network interaction on the sending side starts with sending a library programming call from the application 34 to the SSL library 32 (S200), followed by stream socket calls and key operation calls (S202) to the kernel driver 30, where application specific IDs and user specific IDs are added and sent to the network encryption device 10 (S204). The network encryption device 10 duplicates the request to the trusted container 20 and transforms the message to TCP/IP as in prior art (S206). Thus, the request is sent to the trusted container 20 and the network interface device 28 (S208) in parallel.

A return message is sent from the network encryption device 10 to the kernel driver 30 (S210), from there to the SSL library 32 (S212) and finally to the application 34 (S214).

FIG. 3 depicts a message sequence chart for a message with network interaction on a receiving side according to an embodiment of the invention.

The message sequence starts with receiving a TCP/IP message with data from the network interface device 28 on the network encryption device 10 (S300). The network encryption device 10 duplicates the request and the data to the trusted container 20 (S316) and transforms the message to TCP/IP as in prior art. Data are returned through the kernel driver 30 (S302), and the SSL library 32 (S304) to the application 34 (S306), followed by a receive message from the application 34 to the SSL library 32 (S308) and the kernel driver 30 (S310), as well as to the network encryption device 10 (S312).

FIG. 4 depicts a message sequence chart for a message without network interaction, i.e., a local message, according to an embodiment of the invention. This message, e.g., serves for a key exchange.

The message sequence in FIG. 4 starts with sending a library programming call from the application 34 to the SSL library 32 (S400), followed by stream socket calls and key operation calls (S402) to the kernel driver 30, where application specific IDs and user specific IDs are added and sent to the network encryption device 10 (S404). The network encryption device 10 duplicates the request to the trusted container 20 and processes it internally. Thus, the request is sent to the trusted container 20 (S406).

A return message is sent from the network encryption device 10 to the kernel driver 30 (S408), from there to the SSL library 32 (S410) and finally to the application 34 (S412).

The inventive embodiment is not restricted to secure socket layer/transport layer security (SSL/TLS), it may also be applied to add an un-encrypted data mirroring before quantum encryption devices, or to add an un-encrypted data mirroring for a user datagram protocol UDP/IP based on encryption protocols, when the encryption is moved from the application 34 and library layer to a hardware accelerated network encryption device 10. Examples for such an UDP based encryption protocol would be quick UDP internet connections (QUIC) or certain setups of internet protocol security (IPSec).

Figure 5:
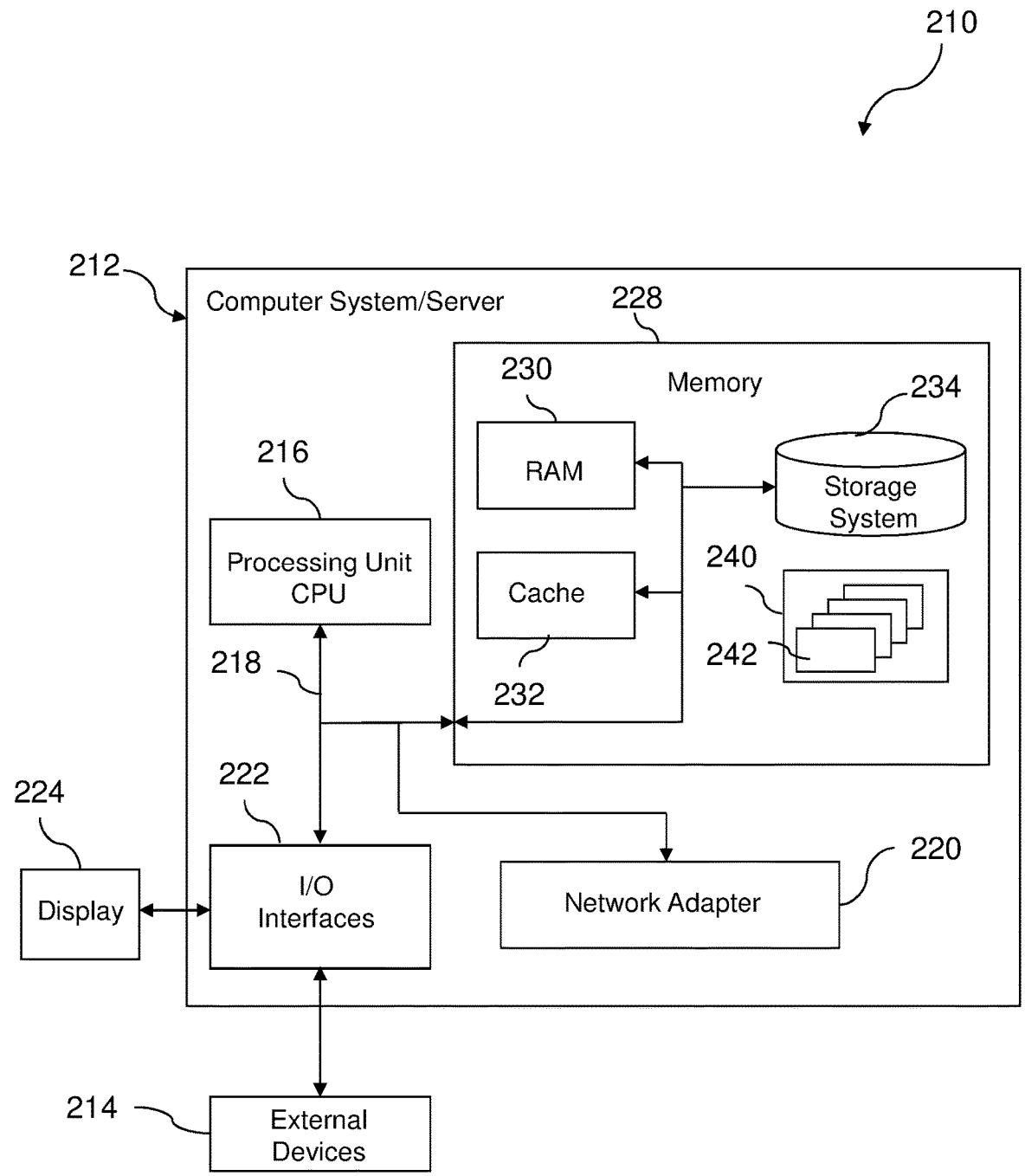
FIG. 5 depicts an example embodiment of a data processing system for executing a method according to the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a network encryption device and a trusted container within firmware or hardware and/or within a virtual machine running on the computer system, wherein the network encryption device provides a secure interface for forwarding data unaltered through a host/operating system between an application and a network interface device, the network encryption device comprising:
a key store to store secret encryption keys; and
a network traffic encryption engine to negotiate and/or store encryption keys in the key store and/or encrypt and/or decrypt network traffic using the encryption keys from the key store; and
the trusted container comprising a flow analyzer executed by the trusted container to analyze network traffic received, via a plug-in interface, from the network encryption device, wherein the flow analyzer generates and/or forwards a flow report to a report engine system, wherein the flow report comprises a plurality of application specific identifiers, each of the plurality of application specific identifiers comprising at least one of an application name, a fingerprint, or an application user identifier,
wherein the encryption keys are used for negotiating session keys for encrypting and/or decrypting the network traffic using the session keys, and wherein the session keys are stored in the network traffic encryption engine separately from the key store.

2. The computer system according to claim 1, wherein the trusted container is connected to the network encryption device via the plug-in interface comprising a data flow analyzer interface.

3. The computer system according to claim 2, wherein the plug-in interface transports a plurality of application specific identifiers.

4. The computer system according to claim 1, further comprising a secure socket layer library executed by the host/operating system, wherein the secure socket layer library forwards stream socket calls and/or key operation calls to the network encryption device.

5. The computer system according to claim 4, wherein the stream socket calls and/or key operation calls are forwarded through a kernel driver.

6. The computer system according to claim 5, wherein the plug-in interface receives the stream socket calls and/or the key operation calls as input.

7. The computer system according to claim 5, wherein the plug-in interface forwards the stream socket calls and/or key operation calls to the flow analyzer to analyze network traffic, wherein the stream socket calls and/or key operation calls are non-encrypted calls.

8. A method for providing encryption with sealed keys in a computer system having a network encryption device and a trusted container within firmware or hardware and/or a virtual machine running on the computer system, wherein the network encryption device provides a secure interface for forwarding data unaltered through a host/operating system between an application and a network interface device, the method comprising:
 providing a network traffic encryption engine to negotiate and/or store encryption keys in a key store implemented in the network encryption device;
 encrypting and/or decrypting network traffic using the encryption keys from the key store; and
 analyzing network traffic received, via a plug-in interface, from the network encryption device by a flow analyzer executed by the trusted container, wherein the flow analyzer generates and/or forwards a flow report to a report engine system, wherein the flow report comprises a plurality of application specific identifiers, each of the plurality of application specific identifiers comprising at least one of an application name, a fingerprint, or an application user identifier,
 wherein the encryption keys are used for negotiating session keys for encrypting and/or decrypting the network traffic using the session keys, and wherein the session keys are stored in the network traffic encryption engine separately from the key store.

9. The method according to claim 8, further comprising:
 providing a secure socket layer library that is executed by the host/operating system, wherein the secure socket layer library directs data from the application to the network encryption device, wherein the data comprises stream socket calls and/or key operation calls and/or application specific identifiers, and the stream socket calls and/or key operation calls are non-encrypted calls.

10. The method according to claim 9, further comprising forwarding the data through a kernel driver.

11. The method according to claim 8, further comprising:
 forwarding the network traffic from the network encryption device to the flow analyzer via the plug-in interface comprising a data flow analyzer interface.

12. A computer program product for providing encryption with sealed keys in a computer system having a network encryption device and a trusted container within a firmware or hardware and/or a virtual machine running on the computer system, wherein the network encryption device provides a secure interface for forwarding data unaltered through a host/operating system between an application and a network interface device, the computer program product comprising a computer readable storage medium having program instructions embodied therewith, the program instructions when executed by a computer to cause the computer to perform a method comprising:
 providing a network traffic encryption engine for negotiating and/or storing encryption keys in a key store implemented in the network encryption device;
 encrypting and/or decrypting network traffic using the encryption keys from the key store; and
 analyzing network traffic received, via a plug-in interface, from the network encryption device by a flow analyzer executed by the trusted container, wherein the flow analyzer generates and/or forwards a flow report to a report engine system, wherein the flow report comprises a plurality of application specific identifiers, each of the plurality of application specific identifiers comprising at least one of an application name, a fingerprint, or an application user identifier,
 wherein the encryption keys are used for negotiating session keys for encrypting and/or decrypting the network traffic using the session keys, and wherein the session keys are stored in the network traffic encryption engine separately from the key store.

13. The computer program product according to claim 12, wherein the program instructions further cause the computer to perform operations comprising:
 providing a secure socket layer library that is executed by the host/operating system, wherein the secure socket layer library directs data from the application to the network encryption device, wherein the data comprises stream socket calls and/or key operation calls and/or application specific identifiers, and the stream socket calls and/or key operation calls are non-encrypted calls.

* * * * *